United States Patent [19]

Barber

[11] 4,102,294
[45] Jul. 25, 1978

[54] COFFEE POT PERK ALARM

[75] Inventor: Charles R. Barber, Lufkin, Tex.

[73] Assignee: The Raymond Lee Organization, Inc., New York, N.Y. ; a part interest

[21] Appl. No.: 791,978

[22] Filed: Apr. 28, 1977

[51] Int. Cl.² .......................................... A47J 27/212
[52] U.S. Cl. .................................... 116/103; 99/285; 126/388
[58] Field of Search ............................... 116/101–103; 99/285, 344; 126/388

[56] References Cited

U.S. PATENT DOCUMENTS

| 2,630,112 | 3/1953 | Zide | 126/388 |
| 2,630,113 | 3/1953 | Zide | 126/388 |

Primary Examiner—Daniel M. Yasich
Attorney, Agent, or Firm—Daniel Jay Tick

[57] ABSTRACT

A stem in an alarm housing coaxially removably coupled to the lid of a coffee pot via a hole formed through the lid extends through the bore of a collar mounted in the housing and having a coaxial bore formed therethrough. A spherical member is coaxially affixed to the stem at an intermediate point thereof and has a diameter greater than the diameter of the bore of the collar and rests in such bore whereby the stem is freely rockable in the collar. A hollow shell is mounted on the stem at the upper end thereof and has a rattle member encased therein which produces an alarm sound whenever it strikes the shell. An actuating member is mounted on the stem at the lower end thereof and is positioned in close proximity with the top of the perforated tube of the coffee pot. Thus, when the coffee perks, water flows into the top of the tube of the coffee pot and strikes the actuating member to produce an oscillatory motion of the stem about the spherical member thereof. This causes the rattle member to strike the shell to produce a series of alarm sounds.

1 Claim, 3 Drawing Figures

COFFEE POT PERK ALARM

BACKGROUND OF THE INVENTION

The present invention relates to a coffee pot perk alarm. More particularly, the invention relates to a coffee pot perk alarm for a coffee pot having a perforated tube removably positioned essentially coaxially in the pot and extending from the bottom of the pot to the top of the pot whereby water flows upward through the tube to the top thereof and through the top thereof when the coffee perks. A lid removably covers the pot at the top of the perforated tube.

Objects of the invention are to provide a coffee pot perk alarm of simple structure, which is inexpensive in manufacture, installable with facility and convenience in new and existing coffee pots, operates without an external source of power, and functions efficiently, effectively and reliably to sound an alarm when coffee in the pot commences to perk thereby advising a person making the coffee of such fact although that person may be in another room at the time.

BRIEF DESCRIPTION OF THE DRAWINGS

In order that the invention may be readily carried into effect, it will now be described with reference to the accompanying drawings, wherein.

DETAILED DESCRIPTION OF THE INVENTION

Figure 1:
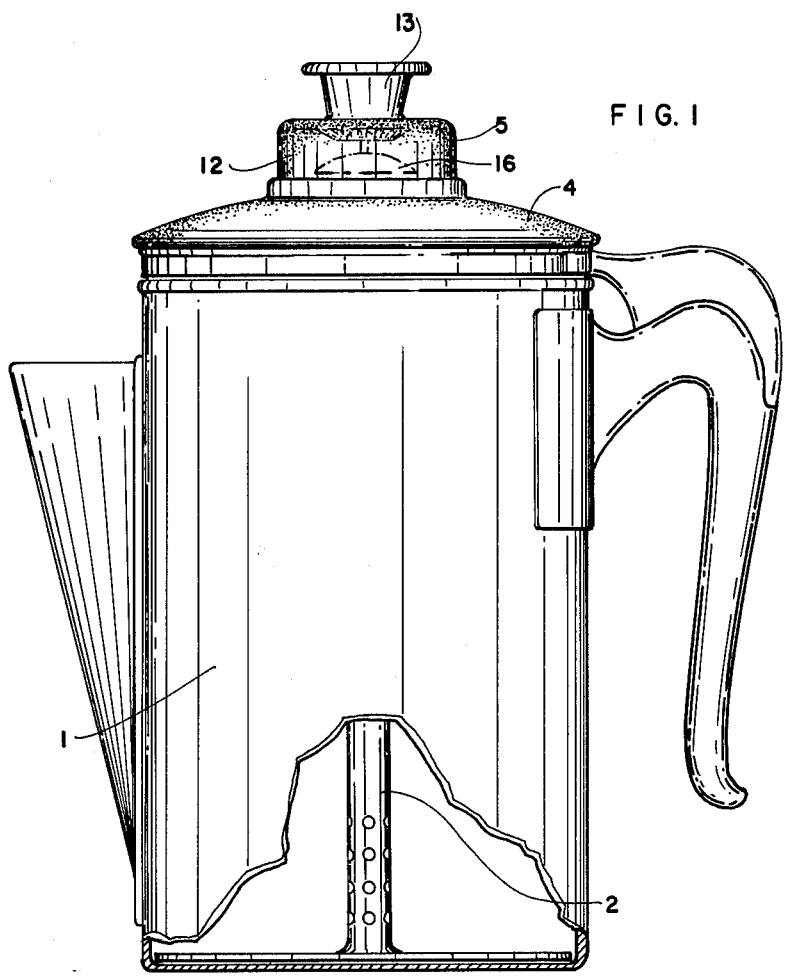
FIG. 1 is a view of an embodiment of the coffee pot perk alarm of the invention mounted on a coffee pot shown partly cut away.
Figure 2:
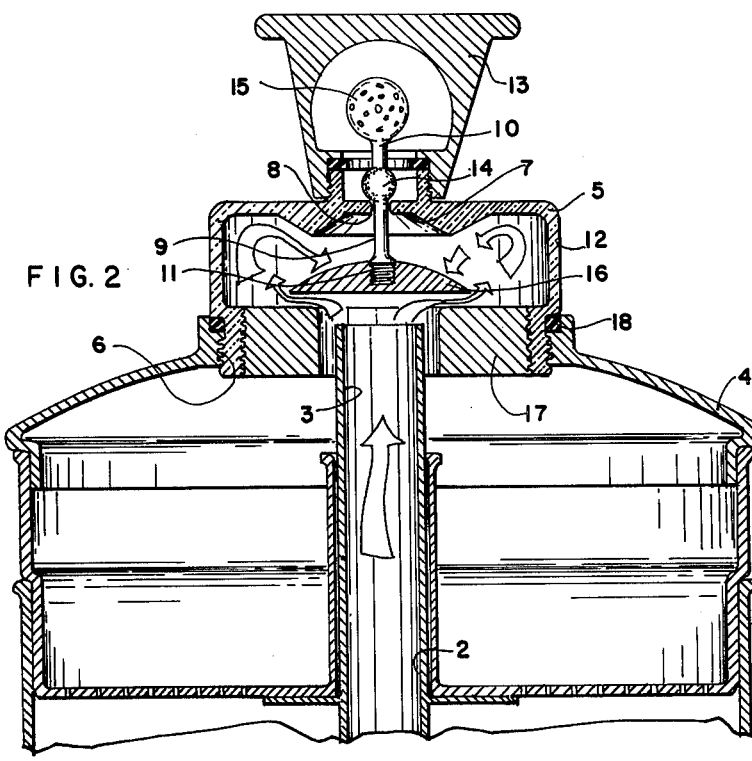
FIG. 2 is a view, on an enlarged scale, partly in section, of an embodiment of the coffee pot perk alarm of the invention, explaining its use.

The coffee pot perk alarm of the invention is for a coffee pot 1 having a perforated tube 2 removably positioned essentially coaxially in the pot and extending from the bottom of the pot to the top of the pot, as shown in FIGS. 1 and 2. Thus, water flows upward through the tube 2 to the top 3 thereof (FIG. 2) and through the top thereof, when the coffee perks. A lid 4 removably covers the pot 1 at the top of the perforated tube 2 (FIGS. 1 and 2).

The coffee pot perk alarm of the invention comprises an alarm housing 5 coaxially removably coupled to the lid 4 via a hole 6 coaxially formed through the lid 4, as shown in FIG. 2. The housing 5 opens into the pot 1 via the hole 6.

Figure 3:
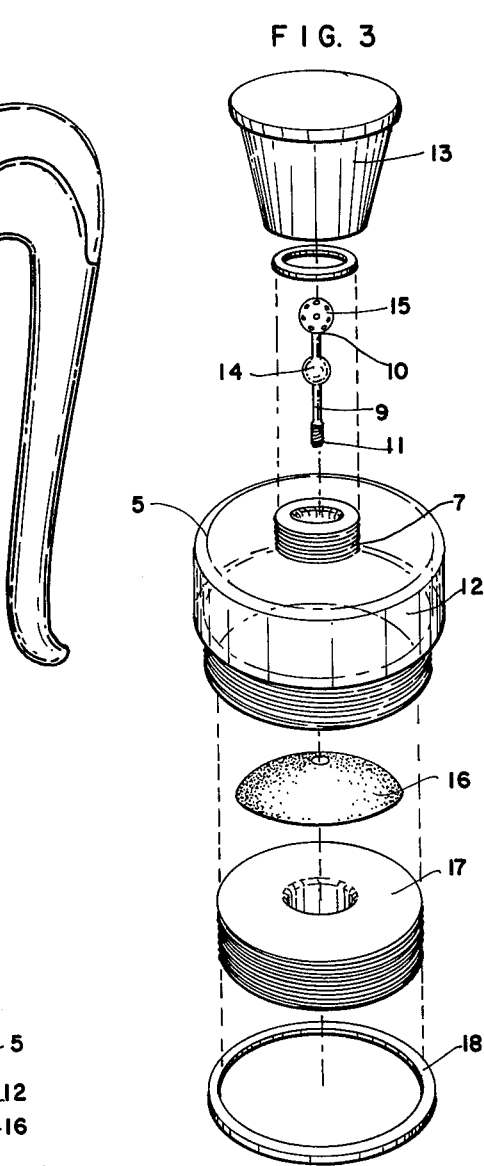
FIG. 3 is an exploded perspective view of the embodiment of FIG. 2.

A collar 7 has a coaxial bore 8 formed therethrough and is provided in the housing 5, as shown in FIGS. 2 and 3.

A stem 9 (FIGS. 2 and 3) is positioned in the housing 5 and extends through the bore 8, as shown in FIG. 2. The stem has spaced opposite upper and lower ends 10 and 11.

The housing 5 includes a transparent plastic or glass part 12 and an opaque knob part 13 to facilitate handling of the lid 4. The knob part is hollow, as shown in FIG. 2, and is threadedly coupled to the transparent part 12.

A substantially spherical member 14 (FIGS. 2 and 3) is coaxially affixed to the stem 9 at an intermediate point thereof and has a diameter greater than the diameter of the bore 8 of the collar 7, as shown in FIG. 2. The substantially spherical member 14 rests in the bore 8 of the collar 7 whereby the stem 9 is freely rockable, oscillatable, and otherwise rotatably movable in the collar.

A hollow perforated shell 15 of substantially spherical configuration is mounted on the stem 9 at the upper end 10 thereof, as shown in FIGS. 2 and 3. The shell 15 has a rattle member encased therein (not shown in the FIGS.) which produces an alarm sound whenever it strikes the shell. The shell 15 may thus consist of a bell type metal and the rattle member may consist of metal beads, so that the overall effect is a bell type rattle.

An actuating member 16 is mounted on the stem 9 at the lower end 11 thereof and is positioned in close proximity with the top 3 of the perforated tube 2. The actuating member 16 is of generally solid hyperboloidal configuration and has a substantially planar surface adjacent the top 3 of the perforated tube 2. In actuality, the hole 6 coaxially formed through the lid 4 is filled with an annular stopper 17 and the top 3 of the perforated tube 2 of the pot 1 extends into the open central area of said stopper.

Thus, when the coffee perks in the pot 1, water flows through the top 3 of the perforated tube 2 and strikes the actuating member 16. This produces an oscillatory or rocking motion of the stem 9 about the spherical member 14 thereof to cause the rattle member to strike the shell 15 to produce a series of alarm sounds. The alarm housing 5 is maintained in liquidtight relation with the lid 4 by an O-ring 18 of any suitable type (FIGS. 2 and 3).

While the invention has been described by means of a specific example and in a specific embodiment, I do not wish to be limited thereto, for obvious modifications will occur to those skilled in the art without departing from the spirit and scope of the invention.

I claim:

1. A coffee pot perk alarm for a coffee pot having a perforated tube removably positioned essentially coaxially in the pot and extending from the bottom of the pot to the top of the pot whereby water flows upward through the tube to the top thereof and through the top thereof when the coffee perks and a lid removably covering the pot at the top of the tube, said coffee pot perk alarm comprising an alarm housing coaxially removably coupled to the lid via a hole coaxially formed through the lid, and accommodating the top of the tube coaxially therein, said housing opening into the pot via the hole;

a collar having a coaxial bore formed therethrough provided in the top of the alarm housing, spaced above the lid and in coaxial relation with said lid;

a stem in the housing extending through the bore and having spaced opposite upper and lower ends;

a substantially spherical member coaxially affixed to the stem at an intermediate point thereof and having a diameter greater than the diameter of the bore of the collar and resting in said bore whereby said stem is freely rockable in said collar;

a hollow shell mounted on the stem at the upper end of said stem and having a rattle member encased therein and producing an alarm sound whenever it strikes said shell; and an actuating member mounted on the stem at the lower end of said stem and being positioned in close proximity with the top of the tube whereby when the coffee perks water flows through the top of the tube and strikes the actuating member producing an oscillatory motion of the stem about the spherical member thereof and causing the rattle member to strike the shell to produce a series of alarm sounds.

* * * * *